(12) United States Patent
Schmitt

(10) Patent No.: US 12,546,428 B2
(45) Date of Patent: *Feb. 10, 2026

(54) DEVICE FOR CURING A PIPELINE LINING

(71) Applicant: BRAWO SYSTEMS GmbH, Kaiserslautern (DE)

(72) Inventor: Christopher Schmitt, Otterbach (DE)

(73) Assignee: BRAWO SYSTEMS GMBH, Kaiserslautern (DE)

( * ) Notice: Subject to any disclaimer, the term of this patent is extended or adjusted under 35 U.S.C. 154(b) by 497 days.

This patent is subject to a terminal disclaimer.

(21) Appl. No.: 17/915,239

(22) PCT Filed: Apr. 1, 2021

(86) PCT No.: PCT/EP2021/058732
§ 371 (c)(1),
(2) Date: Sep. 28, 2022

(87) PCT Pub. No.: WO2021/198477
PCT Pub. Date: Oct. 7, 2021

(65) Prior Publication Data
US 2023/0142177 A1  May 11, 2023

(30) Foreign Application Priority Data

Apr. 3, 2020  (DE) ..................... 10 2020 109 410.8

(51) Int. Cl.
*F16L 55/18* (2006.01)
*B29C 35/08* (2006.01)
(Continued)

(52) U.S. Cl.
CPC ........ *F16L 55/1651* (2013.01); *B29C 63/346* (2013.01); *B29C 63/36* (2013.01); *F16L 55/18* (2013.01); *B29C 2035/0827* (2013.01)

(58) Field of Classification Search
CPC ..... F16L 55/18; F16L 55/165; F16L 2101/10; F16L 55/26; B29C 35/08; B29C 65/4845; B29C 2035/0827; B29C 65/1406
(Continued)

(56) References Cited

U.S. PATENT DOCUMENTS 6,031,371 A * 2/2000 Smart ...................... G01V 3/15
324/226
2006/0151913 A1   7/2006 Graham
(Continued)

FOREIGN PATENT DOCUMENTS

DE     102015212025 A1    12/2016
EP         0875713 A2    11/1998
(Continued)

*Primary Examiner* — David R Deal
(74) *Attorney, Agent, or Firm* — LEYDIG, VOIT & MAYER, LTD.

(57) ABSTRACT

The invention relates to a device (10) lot curing a pipeline lining, wherein the pipeline lining comprises a resin which is curable by means of electromagnetic radiation of a specified wavelength or of a specified wavelength range, comprising a housing (11) with a first (12) and a second (14) opposite end piece and with a housing body (16) which extends between the end pieces (12, 14) and with an electrical current and cooling fluid feed line which is connected to die first end piece (12), wherein the housing body (16) has radially extending arms (26), on the outer end surfaces of which here is arranged in each case at least one light-emitting diode (28), which light-emitting diodes emit light of the specified wavelength or of the specified wavelength range and are connected to the electrical current feed line, and wherein, between the arms (26), the housing (10) has cooling fluid passage openings (32) which are coupled to the cooling fluid feed line and which extend in a longitudinal direction at least in certain sections through the housing body (16), wherein the cooling fluid passage open-
(Continued)

ings (32) are delimited radially to the outside in the region of the housing body (16) by longitudinal webs (24), and wherein, between the longitudinal webs (24) and the arms (26) and/or the light-emitting diodes (28) arranged on the arms (26), there is at least one gap-like outlet opening (34), which extends in a longitudinal direction, for the cooling fluid.

20 Claims, 5 Drawing Sheets

(51) Int. Cl.
    *B29C 63/34*     (2006.01)
    *B29C 63/36*     (2006.01)
    *F16L 55/165*     (2006.01)

(58) Field of Classification Search
    USPC ........................................... 138/97, 98
    See application file for complete search history.

(56) References Cited

U.S. PATENT DOCUMENTS

| | | |
|---|---|---|
| 2010/0051168 A1* | 3/2010 | Moeskjaer ............ F16L 55/165 156/64 |
| 2017/0299106 A1* | 10/2017 | Lindelof ............... F16L 55/162 |
| 2018/0106413 A1* | 4/2018 | Kuzniar .................. F16L 55/18 |
| 2018/0162017 A1 | 6/2018 | Kuzniar |
| 2018/0194072 A1* | 7/2018 | Kuzniar ................. B29C 65/14 |
| 2020/0003354 A1 | 1/2020 | Kanres |
| 2020/0049301 A1* | 2/2020 | Rasmussen ........... F16L 55/179 |
| 2020/0224812 A1* | 7/2020 | Krasowski .......... F16L 55/1653 |
| 2021/0172556 A1* | 6/2021 | Dahl-Nielsen .......... F16L 55/18 |
| 2022/0205578 A1* | 6/2022 | Larsson ................. F16L 55/40 |
| 2023/0182375 A1* | 6/2023 | Schmitt ................ B29C 63/346 156/379.6 |

FOREIGN PATENT DOCUMENTS

| | | |
|---|---|---|
| EP | 2008/101499 A1 | 8/2008 |
| EP | 3236129 A1 | 10/2017 |
| EP | 3321554 A1 | 5/2018 |
| EP | 3336404 A1 | 6/2018 |
| JP | H06-246831 A | 9/1994 |
| WO | 2007/044052 A2 | 4/2007 |
| WO | 2019/036044 A2 | 2/2019 |

* cited by examiner

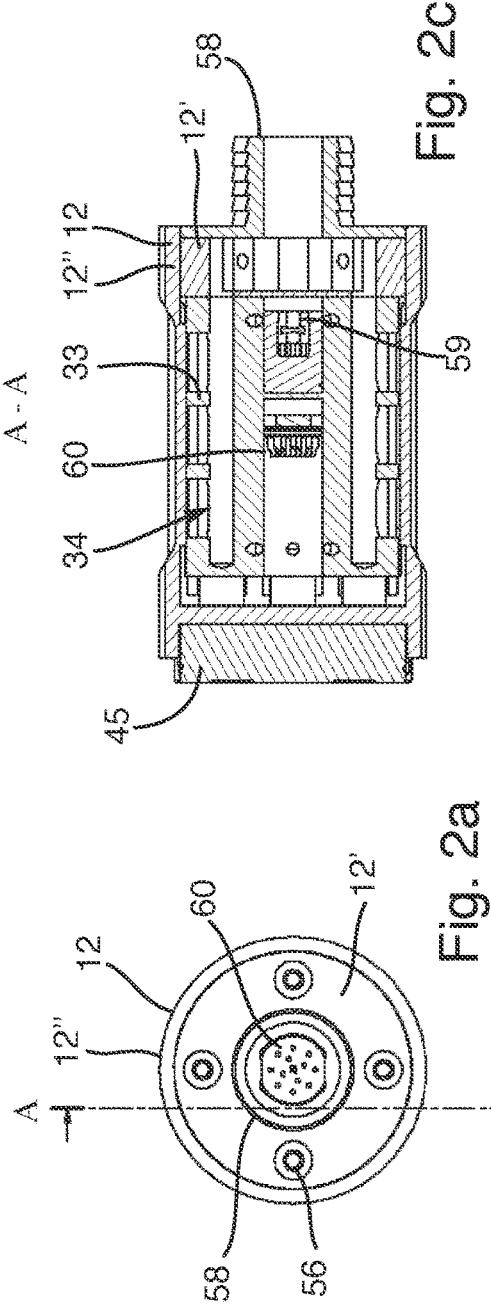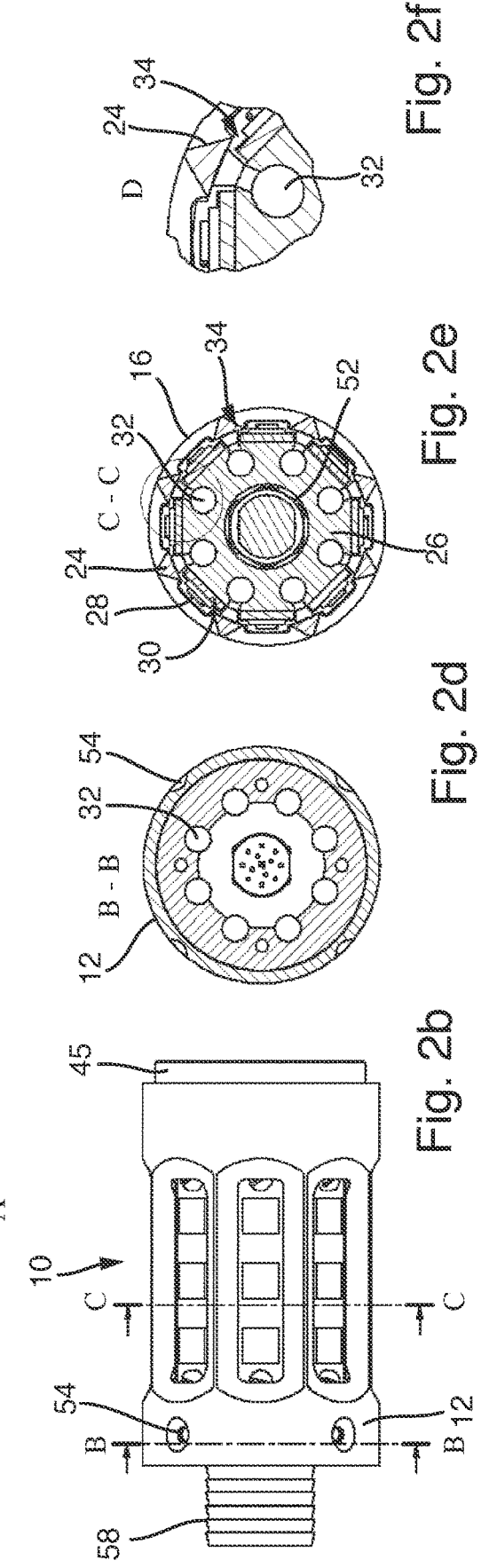

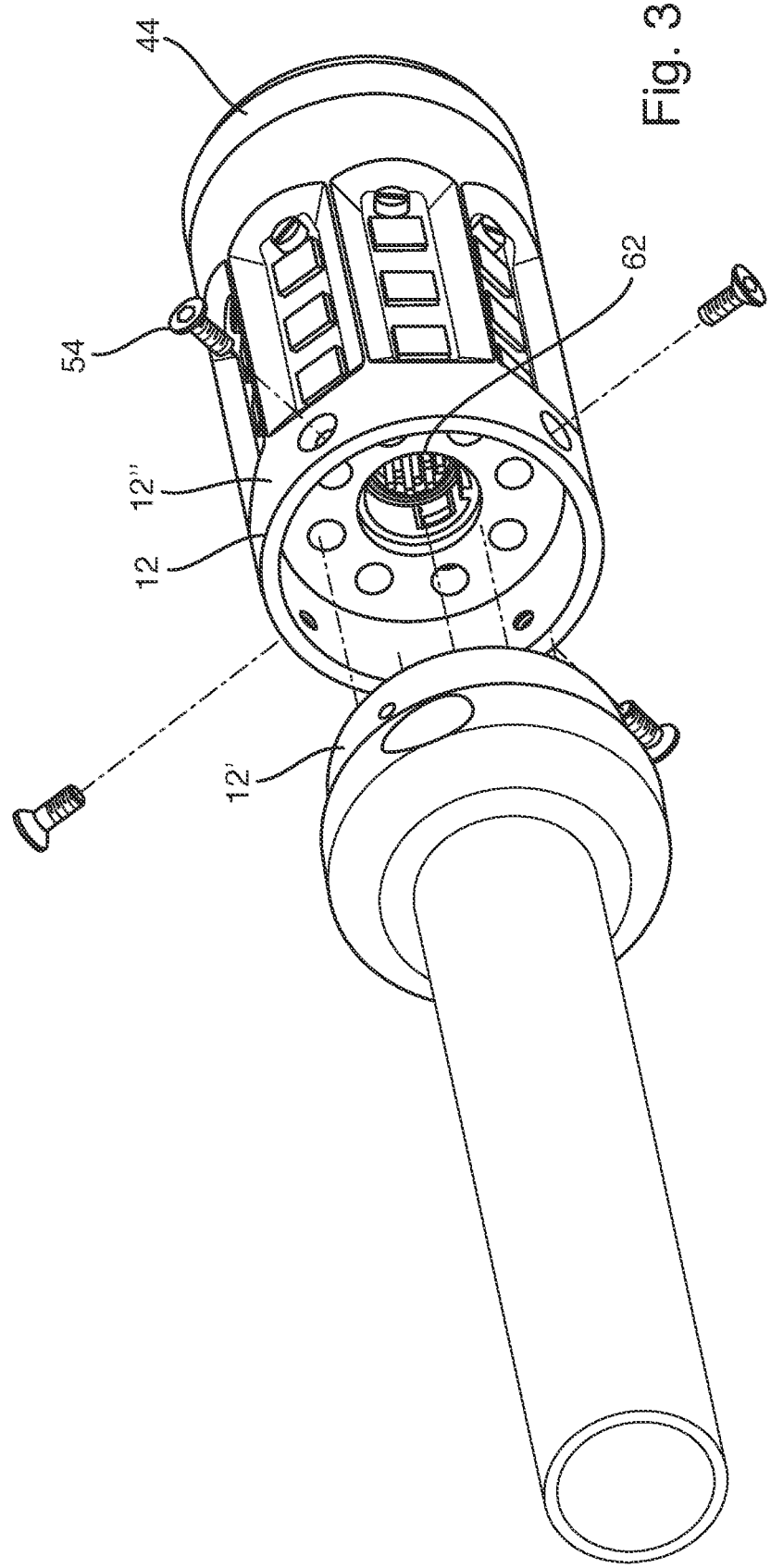

DEVICE FOR CURING A PIPELINE LINING

BACKGROUND OF THE INVENTION

The invention relates to a device for curing a pipeline lining, wherein the pipeline lining comprises a resin, which is curable via electromagnetic radiation of a specified wavelength or a specified wavelength range, comprising a housing having a first end piece and a second, opposing, end piece and a housing body, which extends between the end pieces, and a power and cooling-fluid supply line, which is connected to the first end piece. When rehabilitating pipes, a known method is to insert a tube material (a so-called liner), which is soaked with resin, into the pipe to be rehabilitated and to press it against the inside wall until the resin has cured.

Suitable liner materials are known under the name Brawoliner by Karl-Otto Braun GmbH, Wolfstein, Germany and are described, for example, in DE 10 2015 212 025 A1 or EP 0 875 713 A1. These liner materials may preferably be inserted into the pipe to be rehabilitated in an inversion procedure. In this case, an initially inverted tube, which is soaked with resin, is blown into the pipe to be rehabilitated such that, in the pipe, the side of the tube which was initially on the inside establishes the contact between the tube material and the inside wall of the pipe. In an inversion method, as is known in the prior art, a tubular lining material is coated with a curable resin on the inside by pouring resin into the tube. The tube is then compressed for even distribution of the resin and, in particular, to provide an even layer thickness, and, for example, wound into a so-called inversion drum, wherein the inversion drum is connectable to a so-called inversion bend, which can be introduced into the pipe or channel to be rehabilitated. In this case, the one end of the tubular lining material is turned inside out around the end of the tubular inversion bend and fixed thereon. As a result of introducing a fluid, the tubular lining material is then introduced into the pipeline or the channel whilst being simultaneously inverted. Liquids or gases, preferably water or air, may be used as the fluid.

If necessary, provision may be made to additionally use a supporting tube as part of the lining material. The supporting tube is installed such that it comes to lie inside the other lining material, namely a tube liner, in the pipeline.

The supporting tube is then preferably used if the second, normally closed, end of the lining material cannot be closed, because it is not accessible after the completed rehabilitation and can therefore not be opened.

Before installation, the second end, which comes to lie in the rehabilitated pipeline in the installed state, is normally closed so that fluids can be introduced and the curing material can therefore be applied to the pipeline to be rehabilitated. This end is later removed in order to make the pipeline continuous. If closure of this end cannot be provided for rehabilitation reasons, the previously described additional supporting tube may be installed, the corresponding end of which is then closed. By introducing fluids, either liquids or gases, into the lining material, the lining material is applied to the wall of the pipeline and fixed thereto by means of the resin and hardened there, so that a completely new pipe is then produced in the pipe. On the inside of the installed lining material, a layer may furthermore be provided, which is resistant to the substances which are to be subsequently conducted through it and which, in particular, prevents deposits.

The originally outer side forms the inside of the lined pipe after completion of the inversion procedure.

The terms pipe, pipeline, channel or channel line are used analogously below.

The terms pipe lining, pipeline lining and liner are likewise used analogously.

To cure the resin, in addition to heating the lining material in order to accelerate or initiate the curing process, it is known to conduct steam through the lining material, without needing to release or substantially influence the pre-existing pressure therein, since this may cause the lining material to collapse.

A corresponding approach is known from WO 2007/044052 A2; however, it is preferably only provided once the lining material has been installed and, in particular, for this approach, an opening has to be cut into the lining material. Since, at this point, the lining material is not yet fully cured, additional difficulties may arise. In particular, the curing process at the required temperature may take a period of several hours, during which the drive must be kept in operation.

Resin materials which contain a photoinitiation system have been available for some time, whereby the curing procedure may be initiated and accelerated through the effect of electromagnetic radiation rather than the thermal system. Following irradiation, the curing procedure takes place within a few minutes. To initiate the curing procedure, a radiation source is guided along the pipe, which is equipped with a liner. In this case, the guiding speed is selected such that the amount of radiation is sufficient to initiate the curing procedure. This process is much less time-consuming than the method described above.

With the development of LED technology, it has become possible to construct energy-saving light sources with a small spatial requirement. Specific problems arise in that, despite their comparatively high energy efficiency, the LED lamps still give off significant amounts of heat, which may cause a significant increase in temperature in the pipe to be rehabilitated, whereby overheating of the LEDs may occur to the point where the LEDs fail, which means that the rehabilitation has to be discontinued.

Therefore, the devices used require efficient cooling systems for the LED lamps. Such devices for internal pipe rehabilitation by means of light curing are described for example in EP 2 129 956 A1, which discloses a device and a method for curing a lining of a pipeline. The device comprises a cylindrical housing, on the outer wall of which LEDs are evenly arranged. The housing has an internal passage, in which heat-dissipating elements are arranged. The heat-dissipating elements are in communication with the externally mounted LEDs and transport the heat thereof into the interior of the device. A cooling fluid therein flows through the device and past the heat-dissipating elements.

EP 3 321 554 A1 furthermore describes a device for light-curing a liner material. The device has LEDs, which are provided with heat-dissipating elements on the inside.

Coolant flows through the heat-dissipating elements and thus results in cooling of the LEDs.

An LED head for use in internal pipe rehabilitation is described in EP 3 236 129 A1. The LED head has a housing, on the outer surface of which LED modules are mounted. Coolant flows in a central channel through the housing and is conducted outwards through radially arranged channels.

A method in which a curing device, together with a liner, is installed in a pipe to be rehabilitated is described in WO 2019/036044.

SUMMARY OF INVENTION

The object of the present invention is now to provide a device for curing liner materials for internal pipe rehabilitation, which ensures efficient heat dissipation in a simple manner.

The invention achieves this object by means of a device having the features herein. In this case, the device having the features herein has radially extending arms in the housing, on the outer end faces of which at least one, in particular multiple, radiation sources, in particular light-emitting diodes (LEDs), are arranged in each case, which emit or radiate radiation, in particular light of the specified wavelength or the specified wavelength range, and are connected to the power supply line, wherein the housing has cooling-fluid passage openings between the arms, which cooling-fluid passage openings are coupled to the cooling-fluid supply line so that cooling fluid may enter during operation, and wherein the cooling-fluid passage openings extend in the longitudinal direction at least in certain sections through the housing body. The passage openings preferably extend through the entire housing body, in particular in the regions in which the LEDs are arranged. The cooling-fluid passage openings are delimited radially outwards by longitudinal webs in the region of the housing body, wherein, between the longitudinal webs and the arms, and/or the longitudinal webs and the light-emitting diodes arranged on the arms, there are one or more gap-like outlet openings for the cooling fluid, which extend in the longitudinal direction.

Therefore, the gap-like passage opening may extend, for example, over the entire length of the housing body between the end pieces, in particular in the region in which the LEDs are arranged. In this case, the gap-like passage opening may have a continuous or interrupted form. With an interrupted configuration, the cooling fluid may be even better diverted to the LEDs to be cooled and may be used even more efficiently. To this end, separating elements may be provided on the longitudinal webs, which separating elements interrupt the gap-like passage openings. The separating elements may be radially inwardly extending components, which close the gap-like openings in this region.

The invention is explained below with reference to light-emitting diodes. However, in this case, part of the invention also involves the use of other radiation sources, which fall within the visible spectrum, but also within the UV or IR spectrum. Other forms of radiation, such as microwaves, may likewise be provided. Within the scope of the invention, the term LED shall likewise include such radiation sources.

The advantage consists in that, unlike the known cooling, in which the cooling fluid is guided over one or more cooling elements, via which the heat of the LEDs, which is generated by the heat losses of the LEDs, is conducted to the cooling fluid, according to the invention, the cooling fluid, in particular a gas, is conducted through the passage openings and cools the LEDs directly. According to the invention, the heat transfer is realized via heat convection and not heat conduction. By way of the gap-like outlet openings, the cooling fluid exits directly in the region of the LEDs and flows over them. As a result of the gap-like configuration, the cooling fluid is preferably accelerated as if through a nozzle, whereby the heat dissipation is further improved. The flow over the LEDs is thus improved and more effective cooling is achieved.

The arms are preferably arranged in a star shape (radially symmetrically) and extend from the center of the housing body to its outside, wherein eight arms, and therefore eight cooling-fluid passage openings, are preferably provided, which extend through the housing body. The passage openings extend between the arms. The passage openings and the arms are adapted to one another in terms of their shape. In this regard, the passage openings may be substantially circular in cross-section or they may have a form which widens radially outwards from the center, rather like a slice of pie. Moreover, configurations having more or fewer than eight passage openings are also conceivable, wherein both an even and an odd number may be provided. Although the arms and the passage openings are preferably radially symmetrical, other configurations are also conceivable, in which the arrangement is not an even arrangement around the circumference or is not equidistant.

In this case, the longitudinal webs may have different cross-sectional forms. Triangular cross-sections are preferable, wherein two points serve to form the gap-like outlet openings, and therefore point in the direction of the LEDs or the arms which support the LEDs, and one point points radially outwards. The cooling fluid is conducted particularly well due to the fact that a surface of the longitudinal webs then delimits the passage openings. Alternatively, flat configurations are conceivable, in which the outwardly directed point is not present or is rounded.

It is preferably provided that, in particular, three or more LEDs are arranged on each end face of an arm. Alternatively, however, it is possible that only one LED is provided for each arm. As stated, instead of the LEDs, other radiation sources may also be provided, which shall likewise be subsumed under the term LED within the scope of this application. The LEDs may be provided individually or they may be grouped together as LED modules and installed as modules. In this case, the LEDs of a module may be arranged on a common base plate and they may be powered and collectively controlled via this base plate.

It is preferably provided that the arms, and therefore the radiation sources and/or the longitudinal webs and/or the outlet openings, extend over the entire length of the housing body. A particularly large area, which may provide radiation for curing, is thus provided, along with optimal cooling.

Furthermore, it is preferably provided that the second end piece has a closed form. It is thus ensured that all of the cooling fluid is conducted past the LEDs and is available for cooling purposes. If the second end piece does not have a closed form, it must be ensured by other means that the cooling fluid does not escape via the end piece, but is conducted through the gap-like outlet openings in order to thus ensure convective cooling of the LEDs. This may be realized via further components, for example further devices connected downstream or additional closure means.

The outlet openings may have a width of 0.1 to 10 mm, in particular 0.5 to 5 mm and, in particular, 0.7 to 1.1 mm. In this case, the width is understood to be the shortest distance between the edge of the longitudinal edge and the arm or the LEDs or their module carriers. The width of all outlet openings is preferably the same and constant over their length. Alternatively, however, the width may also vary over the length of the housing body. The ratio of the area of the outlet openings to the cross-sectional area of the passage openings is preferably between 1:2 and 1:6, in particular 1:2.5 and 1:4, and in particular 1:2.9 and 1:3.1. It is thus ensured that the cooling fluid is accelerated in the desired manner as it passes through the outlet openings.

For curing the lining material, it is preferred that the LEDs have an emission maximum at a wavelength of 360 to 450 nm, in particular 365 to 405 nm and in particular 385 to 405 nm and preferably 395 nm.

The device preferably has a substantially cylindrical form, whereby the insertion and guidance through the pipe to be repaired or lined is facilitated. Alternatively, other forms are also conceivable, which are substantially rotationally symmetrical but may also have a polyhedral cross-sectional form, for example.

In particular, it is provided that the end pieces have the same diameter as the housing body. In this case, the diameter of the housing body is determined in particular by the longitudinal webs. That is to say that the end faces of the arms and also the LEDs are set back with respect to the longitudinal webs in this case. It is thus achieved that the LEDs are at the required spacing from the pipe wall or from the lining material, so that the LEDs are not damaged, on the one hand, and curing is reliably ensured.

According to one configuration, the housing may have a central channel, which is surrounded by a housing surface from which the arms extend radially outwards. In this case, the electrical supply, and also further components, for example plugs or other electrical connections, may be provided in the channel.

According to one embodiment, the end pieces and the longitudinal webs may be formed together in one piece.

Likewise, according to the invention, the device may be configured in multiple parts or in one part. The one end piece or both end pieces may preferably be configured in multiple parts. If the first end piece is in multiple parts, it may be provided that a first end piece element, which supports the connection for the cooling-fluid supply line and the power supply line, is provided. This first end piece element may be inserted into a further end piece element of the end piece, which may surround the first end piece element, for example concentrically, and connected to the further end piece element to form the end piece. In this case, the two end piece elements might be connected, for example, via screw connections. Other connection techniques, such as latching connections etc., are likewise conceivable.

According to one exemplary embodiment, the pipeline lining may be tubular and may comprise, in particular, a textile material, which is coated or impregnated with a resin.

The curing procedure under irradiation takes place within a few minutes. To initiate the curing procedure, a radiation source is guided along the pipe which is equipped with a liner. In this case, the guiding speed is selected such that the amount of radiation is sufficient to initiate the curing procedure. This process is much less time-consuming than the curing method which uses steam or other fluids.

It is particularly preferably provided that the second end piece, in particular at its end face, has, or can be connected to, an electromagnet which is coupled to the power supply line and may be energized thereby. From a certain line length, a device for curing a pipe lining material may be exclusively pulled in if it is not driven directly at the head, i.e. at the device itself. To this end, a pull cable is fastened to the device. The device is pulled into the line via this cable. It can only be pulled in if an access is present at the destination point for manually separating the cable from the device. This means that installation of a liner is not possible with a closed end. In addition, the liner must be pressureless during the separation. By releasing the pressure and building the pressure up again, air becomes trapped between the pipeline to be rehabilitated and the installed liner. This air impairs the quality of the rehabilitation.

As a result of the inventive provision of an electromagnet, which cooperates with a metallic counter-piece which is coupled to the liner, the separation of the device from the pipe lining may take place remotely by energizing the electromagnet during the pulling-in procedure and then switching it off so that separation from the metallic counter-piece takes place. According to one configuration, to this end, before the pulling-in procedure, a steel element as a counter-piece is connected to a pull cable and mounted on the liner end. The device, in particular with its second end piece, is guided on this counter piece and the electromagnet is energized. This causes the magnetic field to build up and holds the device on the cable. The device, with the liner, is subsequently pulled, in particular blown (inverted), into the pipe to be rehabilitated. Once the pipe lining material is installed in the pipe to be rehabilitated, the device is separated from the pull cable by switching off the magnet and may be removed from the rehabilitated pipe at a desired time by being pulled out again backwards, i.e. in the direction of the entry point. In this case, the device for curing the pipe lining material is activated during the pulling-out procedure. That is to say, in the inventive case in which the resin undergoes UV curing by means of LEDs, the LEDs are switched on and the device is pulled backwards in the pipe. In this case, the pullback speed is adapted so that adequate irradiation of the newly produced pipe inside wall, formed by the liner, takes place so that the resin may cure completely. The pullback speed may preferably be constant over the entire length. In this case, the electromagnet may be part of the second end piece or it may be in particular releasably connected thereto. In this case, the electromagnet is fixed to the second end piece, and in particular to the free end face thereof, via a screw connection.

In this case, the electromagnet may be plate-like or ring-like and may have, in particular, an external diameter or external dimensions which are smaller, in particular slightly smaller and, in particular, smaller all-around, than the external dimensions of the second end piece.

The electromagnet is particularly preferably couplable to a counter-piece, which has a means, in particular a passage opening, for connection to a pulling-in device for pulling the device into the pipeline. The attachment to the pipe lining material may thus be realized in a particularly simple manner.

According to a particularly preferred configuration, the counter-piece may be in the form of a covering cap for the electromagnet and may cover this in particular in the manner of a hat. In this case, the means, in particular the passage opening, may be incorporated in the covering cap and, in particular, in its form.

The outer circumferential contour of the counter-piece furthermore preferably corresponds to the formed outer contour of the second end piece.

Air, in particular, is used as the cooling fluid. However, other gases or liquids are also conceivable. Further advantages and features are revealed in the description.

BRIEF DESCRIPTION OF THE DRAWINGS

A preferred configuration is described in the following drawing, in which:

FIG. 2 shows a device according to the invention in various views according to FIG. 1;

FIGS. 2a and 2b, c, d, e, f show various views of the device;

FIG. 3 shows a device according to FIG. 1 in a partially open state in a first view;

DESCRIPTION OF THE PREFERRED EMBODIMENTS

Figure 1:
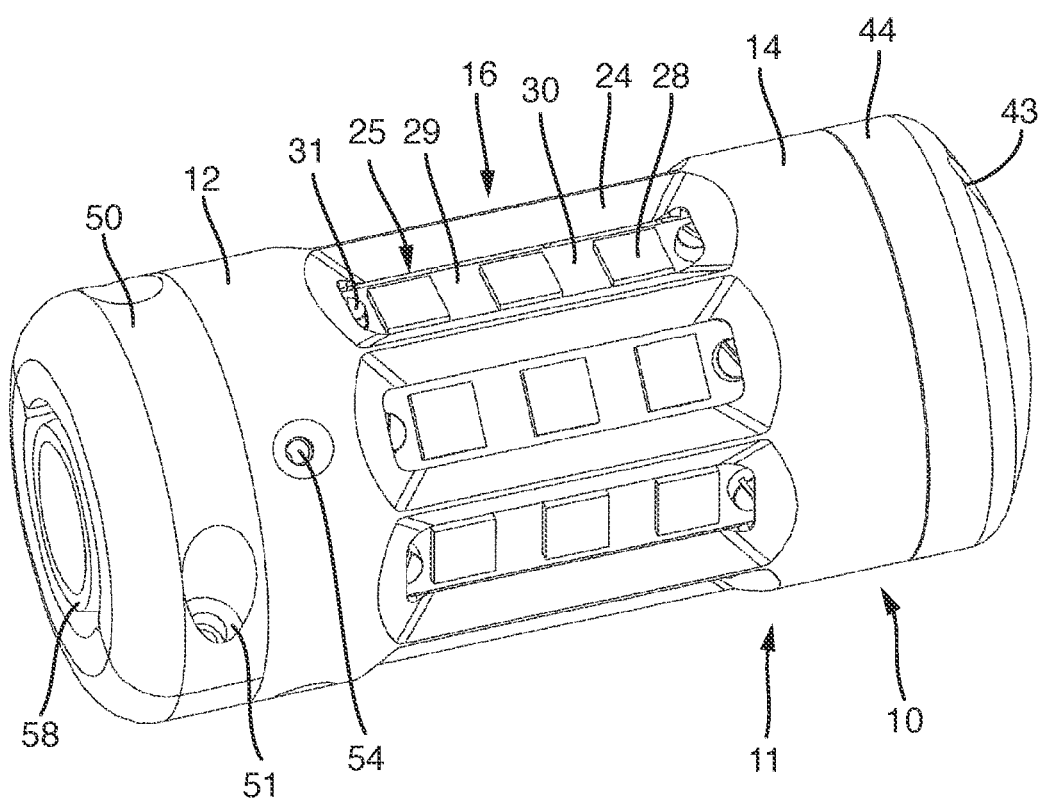
FIG. 1 shows a perspective illustration of the device according to the invention.

FIG. 1 shows, in a perspective illustration, a device which is denoted as a whole by the reference sign 10. The device has a housing 11, with two end pieces, namely a first end piece 12 and a second end piece 14, and a housing body 16 arranged between them. The housing body 16 and the end pieces 12, 14 have a substantially cylindrical form.

The end pieces 12 and 14 are formed in one piece with longitudinal webs 24 of the housing body 16 and are connected thereby. Between the longitudinal webs 24, the housing body 16 has recesses which are denoted by the reference sign 25. LEDs 28, as radiation sources here, are arranged in the recesses 25, wherein, in the exemplary embodiment, three LEDs 28 are arranged on a carrier 30 in each case. The LEDs are provided on the carrier 30 at a spacing from one another in the longitudinal direction. The carriers 30 are connected to the housing body 16 or the device 10 via screw connections 31. The LEDs on the carriers 30 form so-called LED modules 29, which are provided in an even, in particular radially symmetrical, distribution around the circumference of the housing body 16.

The second end piece moreover supports an electromagnet, which, in the illustration shown, is connected to a counter-piece made of an electrically conductive material, which is coupled to a pull cable (not illustrated) for pulling in the device 10.

Figure 4:
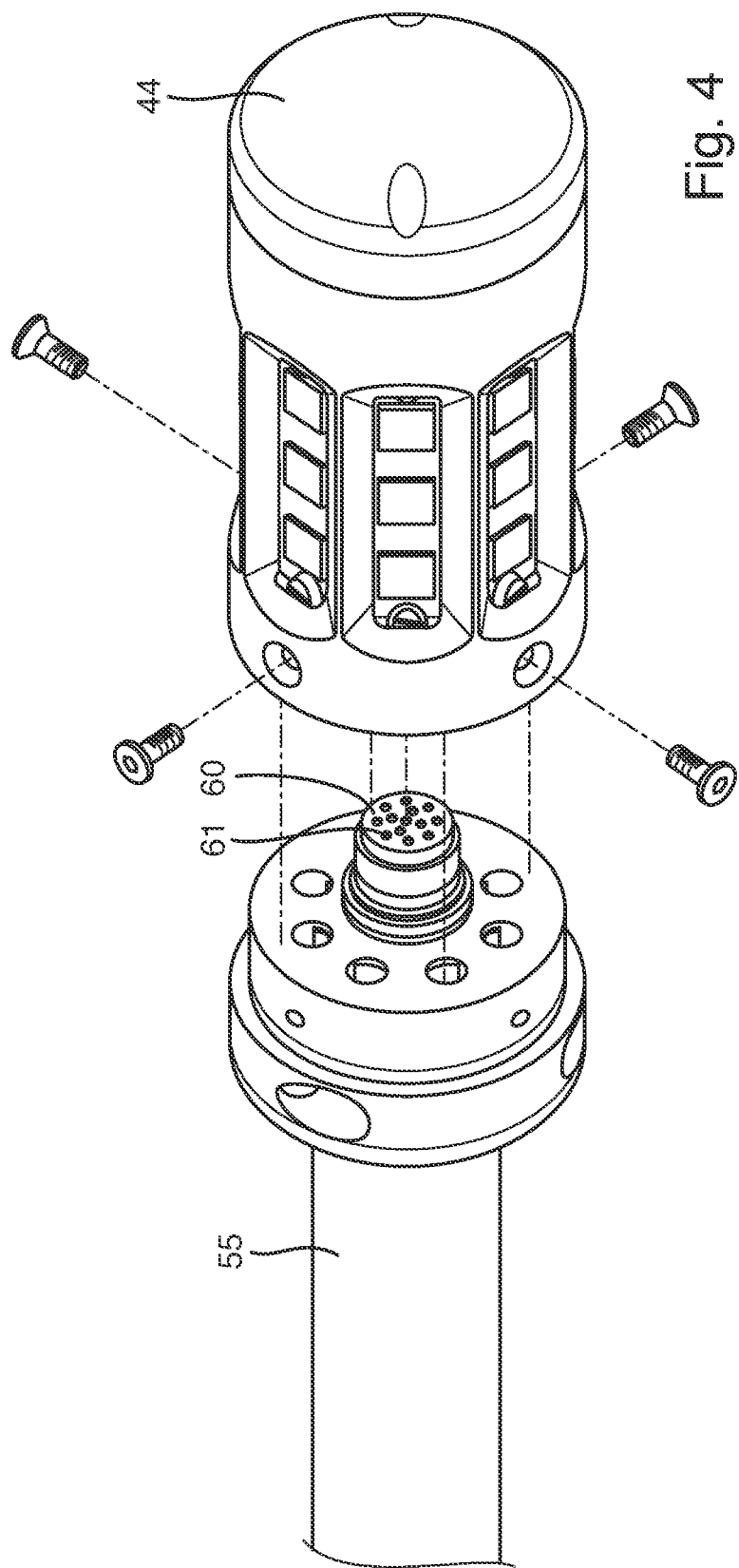
FIG. 4 shows a further view according to FIG. 3.

A tubular connecting element 50, in the interior of which a connection for a cooling-fluid supply line 58 is illustrated, is furthermore provided on the side with the first end piece 12. The tubular connection piece 50 consists of two half rings, which may be connected to one another via a screw connection 51 and which are thus pushed over the cooling-fluid supply line 55 formed as a tube (c.f. FIG. 4) and fix this on the fluid supply line 58.

In this case, the longitudinal webs 24 have a triangular cross-sectional form, wherein one point points outwards and, with the end pieces 12 and 14, forms the lateral surface of the device 10.

In this case, the LEDs 28 point radially outwards, so that they radiate evenly over the circumference and, therefore, as the device 10 is moved through a pipeline to be lined and rehabilitated, subject all regions of a liner material, which has been installed in the pipeline, to corresponding radiation.

FIG. 2 now shows various views of the device 10 in various illustrations a) to f). In this regard, illustration a) shows a plan view of the first end piece 12, wherein the first end piece here is formed by two end piece elements, wherein a first end piece element 12' may be inserted into the further end piece element 12" and may be fixed therein by means of screws, the openings for which are shown in illustration b). The openings for the screw connection are denoted by the reference sign 54.

Moreover, in illustration a), it is possible to see screw connections 56 which correspond to the connection of the inserted end piece element 12'. Likewise visible are the fluid feed 58 and elements of the electrical contacting unit 60, which are visible through the opening of the fluid feed 58.

Figure b) shows a plan view of the lateral surface of the device 10, wherein, in contrast to FIG. 1, the electromagnet 45 is shown here and is not connected to the counter-piece (44) as illustrated in FIG. 1. The electromagnet is configured in the shape of a plate and is arranged on the free end face of the second end piece 14. The electromagnet 45 has a smaller diameter than the second end piece 14, so that the second end piece 14 protrudes all-around.

Figure 5A:
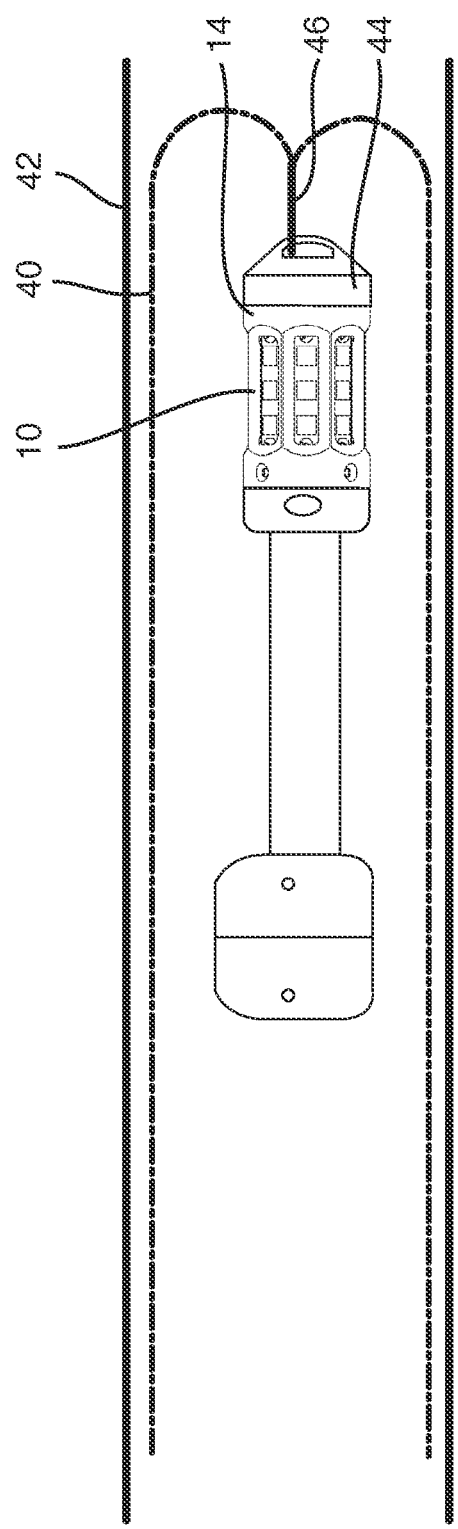
FIG. 5a), 5b) show the device according to FIG. 1 during and after the inversion procedure.
Figure 5B:
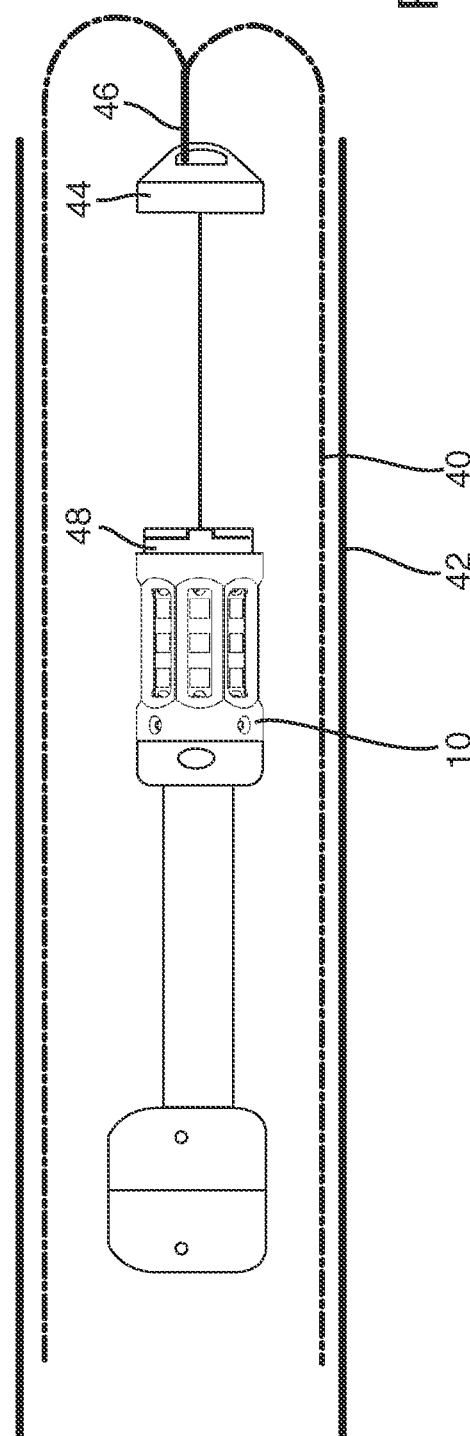

In this case, the magnet is denoted by the reference sign and the counter-piece, connected thereto, is denoted by the reference sign 44. In this case, the counter-piece 44 has a continuous opening 43, via which a fixing procedure (as shown in FIG. 5) and a pulling-in procedure with a liner may take place. The opening 43 for establishing a connection with the liner is illustrated schematically in FIG. 5. The counter-piece 44 is configured in the manner of a covering cap and covers the magnet 45 all-around.

The illustration c) shows a section along the line A-A in illustration a). In this case, it shows the electromagnet and the means for electrical contacting 60.

The illustrations d) and e) show various cross sections through the section planes B-B and C-C, wherein illustration d) shows the transition from the central fluid feed 58 into the provided cooling-fluid passage openings 32, which have a circular form here and are likewise shown in illustration e). In illustration e), a section in the region of the housing body 16 is now shown, wherein the longitudinal ribs 24 may be seen here with their triangular cross-sectional form, with one point pointing radially outwards, wherein the further points point in the direction of the LEDs 28 and the LED carrier 30. Particularly good fluid guidance may thus be achieved, since the outlet openings 34 only have a small width.

Provided between the longitudinal webs 24 and the LEDs 28 or modules 29 or LED carriers 30 are the gap-like outlet openings 34 (already mentioned with reference to FIG. 1), through which the air from the cooling-fluid passage openings 32 exits outwards and is accelerated due to the gap-like configuration. In this case, the gap-like outlet openings 34 do not have a continuous form in the longitudinal direction, as can be seen in illustration c), but extend in each case only in the regions in which an LED of the module 29 which is to be cooled is arranged in each case. The effectiveness of the convective cooling of the LEDs 28 may thus be even further improved. In the intermediate regions, the outlet openings 34 are closed by components 33, which are shown in illustration c).

In this case, the housing body, starting from a central opening 52, has radially outwardly extending arms 26, which reach radially outwards and on the outer end faces of which the light-emitting diodes 28 are arranged. Consequently, the arms likewise delimit the passage openings 32.

FIGS. 3 and 4 now show two perspectives, illustrating the end pieces 12 consisting of two elements 12' and 12", namely the first end piece element 12' and the further end piece element 12", wherein the first end piece element 12' is inserted into the further element 12" and is fixed therein via the screw connections 54.

The magnetic counter-piece 44, which cooperates with the electromagnet (not shown) when the electromagnet 45 is energized, is likewise illustrated here.

FIGS. 3 and 4 show the electrical connection element 60, consisting of a first electrical connection element 61 and a second electrical connection element 62, which cooperate to establish the electrical contacting both of the LEDs 28 and the electromagnet 45.

The pulling-in of the device 10 is shown in FIG. 5. Through the provision of the electromagnet 45, which cooperates with the metallic counter-piece 44 which is coupled to a liner 40, the separation of the device 10 from the pipe lining 40 may take place remotely by energizing the electromagnet 45 during the pulling-in procedure and then switching it off so that separation from the metallic counter-piece 44 takes place. To this end, the counter-piece 44 is connected to a pull cable (pulling-in device) 46, which is mounted in a corresponding opening of the counter piece 44 and whereof the other end is mounted on the liner end 40. The device 10, in particular with its second end piece 14, is guided on this counter-piece 44 and the electromagnet 45 is energized. This causes the magnetic field to build up and holds the device 10 on the cable. The device 10 is subsequently pulled into the liner 40 and introduced with this liner (inversed) into the pipe to be lined. Once the destination point has been reached, the device 10 is separated from the pull cable 46 by switching off the magnet 45 and may be removed from the rehabilitated pipe 42 at a desired time by being pulled out again backwards, i.e. in the direction of the entry point. In this case, if the device comprises a curing medium, this may be activated, e.g. UV radiation may be emitted, so that curing of the resin of the liner takes place. In this case, the pullback speed is determined by the curing properties. In this case, the electromagnet 45 may be part of the second end piece 14 or it may be in particular releasably connected thereto. In this case, the electromagnet 45 is fixed to the second end piece 14, and in particular to the free end face thereof, via a screw connection.

The invention claimed is:

1. A device (10) for curing a pipeline lining, wherein the pipeline lining comprises a resin, which is curable via electromagnetic radiation of a specified wavelength or a specified wavelength range, comprising
   a housing (11) having a first (12) and a second (14), opposing, end piece and a housing body (16) extending between the end pieces (12, 14) and a power and cooling-fluid supply line, which is connected to the first end piece (12), wherein
   the housing body (16) has radially extending arms (26), on the outer end faces of which at least one light-emitting diode (28) is arranged in each case, which light-emitting diodes emit light of the specified wavelength or the specified wavelength range and are connected to the power supply line,
   the housing (10) has cooling-fluid passage openings (32) between the arms (26), which cooling-fluid passage openings are coupled to the cooling-fluid supply line and extend in the longitudinal direction at least in certain sections through the housing body (16),
   the cooling-fluid passage openings (32) are delimited radially outwards by longitudinal webs (24) in the region of the housing body, and between the longitudinal webs (24) and the arms (26), and/or the light-emitting diodes (28) arranged on the arms (26), there is at least one gap-like outlet opening (34) for the cooling fluid, which extends in the longitudinal direction.

2. The device as claimed in claim 1, wherein a plurality of LEDs (28), are arranged on each end face of the arms (26), which LEDs are grouped together in particular to form LED modules (29).

3. The device as claimed in claim 2, wherein the end faces of the arms (26) are set back with respect to the longitudinal webs (24).

4. The device as claimed in claim 3, wherein the arms (26) and/or the longitudinal webs (24) and/or the outlet openings (34) extend over the entire length of the housing body (16), wherein the outlet openings (34) may have an interrupted form.

5. The device as claimed in claim 4, wherein the second end piece (14) has a closed form.

6. The device as claimed in claim 3, wherein the second end piece (14) has a closed form.

7. The device as claimed in claim 2, wherein the arms (26) and/or the longitudinal webs (24) and/or the outlet openings (34) extend over the entire length of the housing body (16), wherein the outlet openings (34) may have an interrupted form.

8. The device as claimed in claim 7, wherein the second end piece (14) has a closed form.

9. The device as claimed in claim 1, wherein the end faces of the arms (26) are set back with respect to the longitudinal webs (24).

10. The device as claimed in claim 9, wherein the arms (26) and/or the longitudinal webs (24) and/or the outlet openings (34) extend over the entire length of the housing body (16), wherein the outlet openings (34) may have an interrupted form.

11. The device as claimed in claim 10, wherein the second end piece (14) has a closed form.

12. The device as claimed in claim 1 wherein the arms (26) and/or the longitudinal webs (24) and/or the outlet openings (34) extend over the entire length of the housing body (16), and the outlet openings (34) may have an interrupted form.

13. The device as claimed in claim 12, wherein the second end piece (14) has a closed form.

14. The device as claimed in claim 1, wherein the second end piece (14) has a closed form.

15. The device as claimed in claim 1, wherein the outlet openings (34) have a width of 0.1 to 10 mm.

16. The device as claimed in claim 1, wherein the LEDs (28) have an emission maximum at a wavelength of 360 to 450 nm.

17. The device as claimed in claim 1, wherein the device (10) has a rotationally symmetrical form.

18. The device as claimed in claim 1, wherein the end pieces (12, 14) are connected to the longitudinal webs (24) in one piece.

19. The device as claimed in claim 1, wherein the housing (11) has a central channel (52), which is surrounded by a housing surface from which the arms (26) extend radially outwards.

20. The device as claimed in claim 1, wherein an electromagnet (45) is provided on the second end piece (14), which electromagnet is coupled to the power supply line and may be energized thereby.

* * * * *